United States Patent
Joffre et al.

(10) Patent No.: US 7,834,087 B2
(45) Date of Patent: Nov. 16, 2010

(54) ANIONIC AND CATIONIC SACCHARIDE-SILOXANE COPOLYMERS

(75) Inventors: Eric Jude Joffre, Midland, MI (US); Joseph Charles McAuliffe, Sunnyvale, CA (US)

(73) Assignee: Dow Corning Corporation, Midland, MI (US)

(*) Notice: Subject to any disclaimer, the term of this patent is extended or adjusted under 35 U.S.C. 154(b) by 115 days.

(21) Appl. No.: 11/915,077

(22) PCT Filed: May 23, 2006

(86) PCT No.: PCT/US2006/020292

§ 371 (c)(1),
(2), (4) Date: Apr. 9, 2008

(87) PCT Pub. No.: WO2006/127924

PCT Pub. Date: Nov. 30, 2006

(65) Prior Publication Data

US 2008/0200612 A1    Aug. 21, 2008

Related U.S. Application Data

(60) Provisional application No. 60/683,718, filed on May 23, 2005.

(51) Int. Cl.
*C08F 297/04* (2006.01)
(52) U.S. Cl. ...................................................... 525/54
(58) Field of Classification Search .................... 525/54

See application file for complete search history.

(56) References Cited

U.S. PATENT DOCUMENTS

2004/0071746 A1* 4/2004 Popplewell et al. ......... 424/401

\* cited by examiner

*Primary Examiner*—Ling-Siu Choi
*Assistant Examiner*—Sonya Wright
(74) *Attorney, Agent, or Firm*—Dinsmore & Shohl LLP

(57) ABSTRACT

Ionically-modified saccharide siloxane copolymers that comprises a reaction product between an ionic monomer or oligomer and a saccharide-siloxane copolymer, wherein the saccharide-siloxane copolymer has a specified formula, are provided. Dispersions, including emulsions, comprising the ionic saccharide-siloxane copolymers, and methods for manufacturing these compositions, dispersions, and emulsions are also provided.

23 Claims, No Drawings

ANIONIC AND CATIONIC SACCHARIDE-SILOXANE COPOLYMERS

This invention relates to anionic and cationic modified saccharide-siloxane copolymers and dispersions, including emulsions, prepared therefrom. Due to their unique hydrophilicity and substantivity, the novel ionic saccharide-siloxanes may be used to provide benefits to a wide variety of formulation based treatment and care compositions and products.

Compositions comprising covalently bonded saccharide siloxanes and dispersions and emulsions thereof are known in the chemical arts. Saccharide-siloxanes have been recently demonstrated to provide advantages to treatment formulations for personal care substrates, household care substrates, and industrial surface substrates, among others.

In addition, cationic and anionic functional organic material are known in the art. Because of their charge, such ionic functional organics are useful in treating substrates that are similarly charged, such as textiles, certain hard surfaces, and personal care substrates. In particular, cationic modification of polymers through addition or formation of quaternary ammonium functionality has provided the bases for the enhancement of many useful properties based on the ionic interactions.

Compositions comprising carbohydrates and siloxanes with one or both of them comprising ionic functionality are also known in the art. For example, International Application No. WO9429322 describes cationic siloxanyl modified polyhydroxy hydrocarbons or carbohydrates for use as surfactants in formulations with particular application in the plant protection art. The cationic functionality disclosed, however, is achieved by reacting a chloroacetoxy-functional siloxane or an epoxy-functional quaternary siloxane with a tertiary amine-functional polyhydroxy moiety.

Multifunctional ionic siloxane copolymers are disclosed in International Application No. WO200078844 and described as being useful in modifying synthetic materials such as fabrics. The specific intended use is to modify synthetic materials for improved hydrophilicity, thermal regulative properties and softening. The anionic functionality, however, is located on one substituted silicon atom while the nonionic saccharide functionality is located on another, rather than having both the ionic and saccharide functionalities occur on the same silicon atom.

Japanese Patent No. J2002115802 describes a process for preparing cationic modified siloxane graft polysaccharide derivatives. The material is prepared by the reaction of carboxyl group functional polysaccharide derivatives with epoxy functional siloxanes and epoxy functional quaternary amines. The intended use is for hair cosmetics to provide a bright and smooth feeling. Again, however, cationic functionality and siloxane functionality are disclosed to be on differing carbohydrate hydroxyl atoms and there is no disclosure of a cationic functionality and saccharide functionality occurring on the same substituted silicon atom.

An anti-wrinkle silicone polysaccharide compound for use in laundry detergents is disclosed in International Patent No. WO200350144. The compound comprises siloxane and anionic units with the anionic functionality and siloxane functionality located on different carbohydrate hydroxyl atoms rather than on the same substituted silicon atom.

International Patent No. WO200424799 describes an organopolysiloxane modified polysaccharide obtained by esterification of an organopolysiloxane having a carboxylic anhydride residue with a polysaccharide having hydroxy groups. However, the resultant copolymer will not have cationic or anionic functionality unless it is already present on the polysaccharide. In this case the anionic or cationic functionality and siloxane functionality will be on different carbohydrate hydroxyl atoms, rather than the same silicon as the linking group.

Quaternary ammonium functional silicones are well known in the art. For example, U.S. Pat. No. 3,389,160 discloses such compounds and a two-step method for making them. In the first step, an epoxy functional silicone is reacted with a secondary amine to form a tertiary amine functional silicone. This product is then reacted with an alkyl halide to yield a quaternary ammonium functional silicone. Methods wherein a tertiary amine salt is reacted with a pendant epoxy functional silicone are also known. More recently, U.S. Pat. No. 6,482,969 to Helmrick et al., fully incorporated herein by reference, discloses silicon based quaternary ammonium functional compositions made by reacting a quaternary ammonium compound having an epoxide functional or halohydrin functional substituent with a carboxy or amino-functional organo-functional silicone or silane.

Saccharide-siloxanes have been discovered to impart beneficial characteristics to a wide variety of household and personal care compositions. It is contemplated that they will have additional utility in arts wherein the unique attributes they confer to compositions comprising them enhance the intended functioning of the composition. However, there are applications in particular solvent environments where ionic character would be beneficial to the ionic stability and functioning of the composition. Hence, there is a need in the art for ionically functionalized saccharide siloxanes, and dispersions and compositions comprising them.

Accordingly, the present invention is directed to novel saccharide-siloxanes that are tonically modified and are capable of imparting the combined desirable chacteristics of silocone, saccharide, and charged ingredients to formulation-based products such as personal care, household care, and industrial care compositions.

It was surprisingly found that the modificaiton of saccharide-siloxane copolymers into ionic form provides copolymers that, when formulated directly or as dispersions into compositions adapted for various applications, provide increased hydrophilicity and substantivity compared to the formulations comprising unmodified saccharide-siloxanes.

The saccharide-siloxane copolymer has a saccharide component and an organosiloxane component which are linked by a linking group. The saccharide-siloxane copolymer that is modified according to embodiments of the present invention has the following formula:

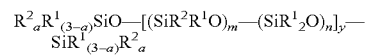

wherein each $R^1$ can be the same or different and comprises hydrogen, $C_1$-$C_{12}$ alkyl, an organic radical, or $R^3$-Q, Q comprises an epoxy, cycloepoxy, primary or secondary amino, ethylenediamine, carboxy, halogen, vinyl, allyl, anhydride, or mercapto functionality, m and n are integers from 0 to 10,000 and may be the same or different, each a is independently 0, 1, 2, or 3, y is an integer such that the copolymer has a molecular weight less than 1 million, $R^2$ has the formula Z-$(G^1)_b$-$(G^2)_c$, and there is at least one $R^2$ per copolymer, wherein $G^1$ is a saccharide component comprising 5 to 12 carbons, b+c is 1-10, b or c can be 0, $G^2$ is a saccharide component comprising 5 to 12 carbons additionally substituted with organic or organosilicon radicals, Z is the linking group and is independently selected from the group consisting of:
—$R^3$—NHC(O)—$R^4$—;
—$R^3$—NHC(O)O—$R^4$—;
$R^3$—NH—C(O)—NH—$R^4$—;
$R^3$—C(O)—O—$R^4$—;
—$R^3$—O—$R^4$—;
—$R^3$—CH(OH)—$CH_2$—O—$R^4$—;
—$R^3$—S—$R^4$
—$R^3$—CH(OH)—$CH_2$—NH—$R^4$—; and
—$R^3$—N($R^1$)—$R^4$, and $R^3$ and $R^4$ are divalent spacer groups comprising $(R^5)_r$ $(R^6)_s(R^7)_t$, where at least one of r, s and t must be 1, and $R^5$ and $R^7$ are either $C_1$-$C_{12}$ alkyl or $((C_1$-$C_{12})O)_p$ where p is any integer 1-50 and each $(C_1$-$C_{12})O$ may be the same or different, $R^6$ is —N($R^8$)—, where $R^8$ is H or $C_1$-$C_{12}$ alkyl, or is Z-X where Z is previously defined or $R^3$, X is a carboxylic acid, phosphate, sulfate, sulfonate or quaternary ammonium radical, and at least one of $R^3$ and $R^4$ must be present in the linking group and may be the same or different, and wherein the saccharide-siloxane copolymer is a reaction product of a functionalized organosiloxane polymer and at least one hydroxy-functional saccharide such that the organosiloxane component is covalently linked via the linking group, Z, to the saccharide component.

One embodiment is directed to a cationic saccharide-siloxane wherein the cationic character is provided by a quaternary ammonium compound comprising a substituent group. The substituent group comprises at least one of epoxide, halohydrin, anhydride or acrylate functionality. In another embodiment, cationic character is provided by a tertiary ammonium compound comprising a substituent group, with the substituent group comprising epoxide, halohydrin, anhydride or acrylate functionality and wherein the tertiary ammonium compound is subsequently converted to a quaternary ammonium compound by alkylation.

A further embodiment is directed to anionic saccharide-siloxanes wherein the anionic character is provided by a carboxylate, phosphate, sulfate or sulfonate compound comprising a substituent group. The substituent group comprises at least one of epoxide, halohydrin, anhydride or acrylate functionality. In another embodiment a cyclic anhydride compound provides a carboxylate character wherein a ring opening yields a carboxylic acid group and an amide bond to the linker group of the saccharide-siloxane copolymer.

In additional embodiments the ionically functionalized saccharide siloxane is formed into a dispersion. In specific embodiments the dispersion comprises a solution or an emulsion.

Embodiments of the present invention also provide methods of making saccharide-siloxane based ionically functional compositions. In a specific embodiment the method comprises: reacting a quaternary ammonium compound comprising a substituent group, the substituent group comprising at least one of epoxide, halohydrin, anhydride or acrylate functionality, with a saccharide-siloxane copolymer as formulaically described above. In another specific embodiment the method comprises: reacting a carboxylate, phosphate, sulfate or sulfonate compound comprising a substituent group, the substituent group comprising at least one of epoxide, halohydrin, anhydride or acrylate functionality, with a saccharide-siloxane copolymer as formulaically described above. In a further specific embodiment the method comprises reacting a cyclic anhydride compound comprising carboxylate character wherein a ring opening yields a carboxylic acid group and an amide bond, with a linker group of a saccharide-siloxane copolymer.

The incorporation of the cationic or anionic monomers provides a lower cost route to hydrophilicity than prior mechanisms such as chain extension of the saccharide group. The increased substantivity or ionic stability are also benefits with utility in personal care and household care formulations, and other applications where such characteristics are desirable.

Anionic and cationic modified saccharide siloxane copolymers in accordance with embodiments of the present invention, when compared to unmodified saccharide siloxane copolymers, provide increased hydrophilicity and substantivity to formulations in which they are added. Generally, the ionic saccharide-siloxanes are prepared by reacting anionic or cationic monomers or oligomers to functional sites of the saccharide siloxanes. The reactive site forms a covalent bond with the saccharide siloxane via the linking group or unreacted Q moieties, as defined in the saccharide-siloxane backbone below.

The saccharide-siloxane copolymer that reacts with a cationic or anionic monomer or oligomer to form the present inventive compounds has a saccharide component and an organosiloxane component which are linked by a linking group and has the following formula:

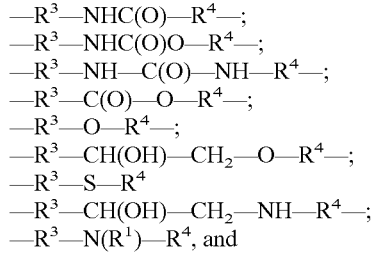

wherein each $R^1$ can be the same or different and comprises hydrogen, $C_1$-$C_{12}$ alkyl, an organic radical, or $R^3$-Q, Q comprises an epoxy, cycloepoxy, primary or secondary amino, ethylenediamine, carboxy, halogen, vinyl, allyl, anhydride, or mercapto functionality, m and n are integers from 0 to 10,000 and may be the same or different, each a is independently 0, 1, 2, or 3, y is an integer such that the copolymer has a molecular weight less than 1 million, $R^2$ has the formula Z-$(G^1)_b$-$(G^2)_c$, and there is at least one $R^2$ per copolymer, wherein $G^1$ is a saccharide component comprising 5 to 12 carbons, b+c is 1-10, b or c can be 0, $G^2$ is a saccharide component comprising 5 to 12 carbons additionally substituted with organic or organosilicon radicals, Z is the linking group and is independently selected from the group consisting of:
—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—$CH_2$—O—$R^4$—;
—$R^3$—S—$R^4$
—$R^3$—CH(OH)—$CH_2$—NH—$R^4$—; and
—$R^3$—N($R^1$)—$R^4$, and $R^3$ and $R^4$ are divalent spacer groups comprising $(R^5)_r$ $(R^6)_s(R^7)_t$, where at least one of r, s and t must be 1, and $R^5$ and $R^7$ are either $C_1$-$C_{12}$ alkyl or $((C_1$-$C_{12})O)_p$ where p is any integer 1-50 and each $(C_1$-$C_{12})O$ may be the same or different, R⁶ is —N(R⁸)—, where R₈ is H or $C_1$-$C_{12}$ alkyl, or is Z—X where Z is previously defined or R³, X is a carboxylic acid, phosphate, sulfate, sulfonate or quaternary ammonium radical, and at least one of R³ and R⁴ must be present in the linking group and may be the same or different, and wherein the saccharide-siloxane copolymer is a reaction product of a functionalized organosiloxane polymer and at least one hydroxy-functional saccharide such that the organosiloxane component is covalently linked via the linking group, Z, to the saccharide component.

The saccharide-siloxane copolymer is formed from hydroxyl-functional saccharides. In specific embodiments the hydroxyl-functional saccharide comprises an aldonic acid or an oligoaldonic acid. In a more specific embodiment the aldonic acid or the oligoaldonic acid comprises a lactone. Two exemplary lactones include gluconolactone (GL) and lactobionolactone (LBL). Both gluconolactone (GL) and lactobionolactone (LBL) are commercially available. Gluconic acid, found naturally occurring in cells, is a polyhydroxy alpha-hydroxy aldonic acid and is typically contained in products in the gluconolactone form. Lactobionic acid (4-O-beta-D-galactopyranosyl-D-gluconic acid) is comprised of a galactose molecule attached to one molecule of gluconic acid via an ether-like linkage. While GL and LBL are readily commercially available saccharides, one of ordinary skill in the art will appreciate that other saccharides are suitable for forming the copolymers of the present invention. In one embodiment the organosiloxane polymer comprises a polydimethylsiloxane.

In specific embodiments the linking group comprises an amide, an amino, a urethane, a urea, an ester, an ether, a thioether, or an acetal functional linking group. In more specific embodiments the linking group comprises an amino functional linking group, and in very specific embodiments the amino functional linking group comprises aminopropyl or aminoethylaminoisobutyl functional groups.

Aldonolactones are particularly suitable saccharides when the organosiloxane comprises amino-functionality and in very specific embodiments the saccharide-siloxane copolymer comprises the reaction product of an amino-functional organosiloxane and a lactone. Hence, in even more specific embodiments, the saccharide-siloxane copolymer comprises the reaction product of an amino-functional organosiloxane and an aldonolactone such as GL or LBL.

The sites for covalent bonding to the ionic monomer or oligomer include the linking group, Z or a reactive group on the Q moiety.

The reactive anionic or cationic molecules suitable for reacting with a saccharide siloxane to form the inventive ionic saccharide-siloxanes herein contain both an ionic component and a reactive site which forms the bond with the saccharide siloxane. In one specific embodiment the reactive component is selected from the group consisting of a β-halogenated alkyl, a 3-chloro-2-hydroxypropyl radical, 2,3-epoxypropyl group, anhydride, acrylate and methacrylate. In a further specific embodiment the ionic component is selected from alkylammonium halide, sulfate, sulfonate, phosphate, carboxylic acid and the salts thereof.

One embodiment is directed to a cationic saccharide-siloxane wherein the cationic character is provided by a quaternary ammonium compound comprising a substituent group. The substituent group comprises at least one of epoxide, halohydrin, anhydride or acrylate functionality. In another embodiment cationic character is provided by a tertiary ammonium compound comprising a substituent group, with the substituent group comprising epoxide, halohydrin, anhydride or acrylate functionality and wherein the tertiary ammonium compound is subsequently converted to a quaternary ammonium compound by alkylation. In a specific embodiment the quaternary ammonium compound has the following structural formula:

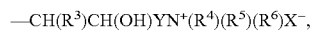

—CH(R³)CH(OH)YN⁺(R⁴)(R⁵)(R⁶)X⁻, wherein Y is a divalent hydrocarbon group; R³ is a monovalent hydrocarbon group or hydrogen; R⁴, R⁵ and R⁶ are independently monovalent hydrocarbon groups; and X⁻ is a counter ion.

It should be understood in construing the scope of the formula provided herein that an designated "R" may exhibit some variation allowed by the overall definition given, unless specifically stated otherwise.

A further embodiment is directed to anionic saccharide-siloxanes wherein the anionic character is provided by a carboxylate, phosphate, sulfate or sulfonate compound comprising a substituent group. The substituent group comprises at least one of epoxide, halohydrin, anhydride or acrylate functionality. In another embodiment a cyclic anhydride compound provides a carboxylate character wherein a ring opening yields a carboxylic acid group and an amide bond to the linker group of the saccharide-siloxane copolymer.

The ionic saccharide siloxanes may also be formed by reacting a molecule comprising a reactive component wherein the reactive component reacts with the linker functionality to impart the cationic or anionic functionality to the saccharide siloxane. Non-limiting examples of such molecules which impart cationic character include: 3-chloro-2-hydroxypropyltrimethylammonium chloride (chlorohydrin), 2,3-epoxypropyltrimethylammonium chloride (glycidyltrimethylammonium chloride); 2-)Acryloyloxy)ethyl]trimethylammonium chloride; chlorostyrene; and 3-chloro-2-hydroxypropyl-alkyl-dimethylammonium chloride, wherein the alkyl is selected from dodecyl-, cocoalkyl, or stearyl. In the product of these reactions, a methyl group within the quaternary ammonium group is substituted by a long-chain alkyl group.

Non-limiting examples of molecules that react with the linker functionality Z to impart anionic character include: 3-sulfopropyl acrylate potassium salt, chloroacetic acid, 2-carboxyethyl acrylate, poly(2-carboxyethyl) acrylate,maleic anhydride, substituted maleic anhydride, e.g. poly(ethylene-co-butyl acrylate-co-maleic anhydride), poly(methyl vinyl ether-alt-maleic anhydride), dichloromaleic anhydride, dimethylmaleic anhydride, diphenylmaleic anhydride, glutaric anhydride, substituted glutaric anhydride, e.g., hexafluoroglutaric anhydride, phthalic anhydride and derivatives e.g. 4-sulfo-1,8-naphthalic anhydride potassium salt, 4-amino-1,8-naphthalic anhydride, dimethylphthalic anhydride, succinic anhydride and its derivatives, e.g., (2-dodecen-1-yl)succinic anhydride, phenylsuccinic anhydride, 2-sulfobenzoic acid cyclic anhydride, itaconic anhydride, phosphoric acid, tetraphosphoric acid and phosphoric anhydride.

In some instances it may be desirable to take a precursor route to synthesis of the cationic functional saccharide-siloxane. Certain molecules may react with, for example, the secondary amine on the linking group to yield a tertiary amine functional group. The tertiary amine functional group may then be converted to a quaternary ammonium group by reaction with a suitable alkylating agent. Examples of compounds with functionality that could react with the linker group to yield a cationic group precursor include, but are not limited to, 2-(diethylamino)ethyl acrylate, 2-dimethylaminoethyl chloride, 2-diethylaminoethyl chloride, and N-(2,3-epoxypropyl) diethylamine. Suitable saccharide-siloxanes include those wherein the linker group comprises functionality such as a secondary amine or hydroxyl. Non-limiting examples of alkylating agents methyl chloride, dimethyl sulfate, diethyl sulfate, and benzyl chloride.

In a specific embodiment 2-(diethylamino)ethyl acrylate is reacted with a saccharide siloxane comprising a linker functionality comprising a secondary amine to form a tertiary amine cationic precursor. In a more specific embodiment the tertiary amine is reacted with an alkylating agent to form the quaternary ammonium cation. In a very specific embodiment the aklylating agent comprises benzyl chloride. The two step procedure may have utility where it is desired to form the cationic group in-situ.

For the cationic compounds of the present invention, generally acceptable counter ions include halogen ions, such as chlorine and bromine, as well as others such as acetate and methyl sulfate. For the anionic compounds, generally acceptable counter ions include, sodium, potassium, lithium, ammonium, and organic amines, e.g triethanolamine or diethylamine. Counter ions are preferably non-reactive internally; that is, non-reactive with the corresponding saccharide-siloxane portion of the molecule as a whole or others like it.

The ionic saccharide-siloxane copolymers of the present invention typically exist as gums, waxy solids or solids at ambient conditions. It should be noted, however, that there is a small subset of the copolymer that does exist in a liquid form, and liquid dispersible forms may also be produced by manipulating conditions such as temperature. However, in order for most of the ionic saccharide-siloxane copolymers to achieve a viscosity range that permits ready formation of dispersions, for example solutions or emulsions, they must first be solubilized by being dissolved in a suitable solvent or solvent blend.

The ionic saccharide-siloxane copolymers may be formulated into in a substantially pure form, or as dispersions in the form of either solutions or emulsions. Depending on the form used, the ionic saccharide-siloxane copolymers may be formulated into oil in water, water in oil, water in silicone and silicone in water systems. In the case of some aqueous-based formulations the ionic saccharide-siloxane may be added directly to the formulation as a solid. In one embodiment the dispersion is in the form of a solution. The solvent may be substantially aqueous or substantially non-aqueous depending on the nature of the particular ionic saccharide-siloxane selected. In a specific embodiment the substantially nonaqueous solvent comprises a volatile or non-volatile solvent and in a very specific embodiment the substantially nonaqueous solvent comprises a volatile hydrocarbon or a silicone or mixtures thereof. In a more specific embodiment the substantially nonaqueous solvent comprises a silicone.

The solubilized copolymer may be used to form a solution or emulsion for ready delivery into target compositions. The particular solvent blend is selected based upon the ionic properties of the saccharide-siloxane copolymer, and the suitability of that solvent for the intended application. In one specific embodiment the solvent blend comprises a mixture of paraffin and an alcohol. In a very specific embodiment the alcohol comprises isopropyl alcohol.

The term "dispersion" as used herein means a two-phase system where a first phase comprises finally divided particles distributed throughout a bulk second phase and the first phase constitutes an "internal" or dispersed phase while the second phase constitutes an "texternal" or continuous phase.

The term "solution" as used herein is intended broadly to include mechanical dispersions, colloidal dispersions and true solutions, and should not be construed as limited to the latter. A solution is a dispersion comprising a uniformly dispersed mixture wherein a first phase constitutes the solute and a second phase constitutes the solvent.

The term "emulsion" as used herein means a dispersion comprising a mixture of two immiscible liquids with the liquid constituting the first, dispersed internal phase being suspended in the second, continuous phase with the aid of an emulsifier.

The term "volatile" as used herein means that the solvent exhibits a significant vapor pressure at ambient conditions. Examples of suitable volatile silicones include siloxanes such as phenyl pentamethyl disiloxane, phenylethylpenamethyl disiloxane, hexamethyldisiloxane, methoxy propylheptamethyl cyclotetrasiloxane, chloropropyl pentamethyl disiloxane, hydroxypropyl pentamethyl disiloxane, octamethyl cyclotetrasiloxane, decamethyl cyclopentasiloxane and mixtures thereof. Particularly suitable silicones are the cyclomethicones. In a very specific embodiment the volatile silicone comprises a cyclic siloxane.

The ionic saccharide-siloxane copolymer may be delivered into compositions as a dispersion. Diluting or dispersing the copolymers makes them easier to process and suitably employable solvents include polydimethylsiloxanes, hydrocarbons, and alcohols. Particularly suitable solvents are cyclic siloxanes and hydrocarbon-alcohol mixtures and water.

Due to the compatibility of the ionic saccharide-siloxane copolymer with hydrocarbons, silicones and alcohols, as well as with water, they may be incorporated into both aqueous and non-aqueous based compositions and products.

Various synthetic routes to saccharide siloxane copolymers are well known in the art and may be employed. One of ordinary skill in the art will appreciate that suitable saccharide-siloxanes may be formed from a variety of synthetic means and that the saccharide may be covalently linked to the siloxane through a variety of linking bonds including esters, ethers, amides, urethanes, ureas, epoxides and the like.

The ionic saccharide-siloxanes may be dispersed as emulsions. In one embodiment, the emulsion is an oil in water emulsion comprising an internal phase comprising the ionic saccharide-siloxane and a continuous phase comprising water. The ionic saccharide-siloxane emulsion comprises at least one surfactant which maintains the dispersion of the internal phase due to its amphipathic character. The anionic or cationic functionality may provide additional emulsion stability by augmenting steric stabilization with electrostatic repulsion.

Other embodiments provide methods for preparing the emulsions. The ionic saccharide-siloxane emulsions may be prepared either by: 1) emulsifying preformed saccharide-siloxane fluids and polymers or 2) by polymerizing saccharide-siloxane monomers into higher molecular weight fluids and polymers in each individual emulsion particle, e.g. via emulsion or suspension polymerization. In one embodiment, a surfactant-water blend is added to a solubilized saccharide-siloxane copolymer first in order to establish the dispersion and fix the water phase. Optional additional portions of water are added as required by the desired property profile of the emulsion and/or its intended applications.

It will be understood by one of ordinary skill in the art that there is a continuum for the ease with which a desired emulsion forms. Ionic saccharide-siloxane emulsions share similar constraints with other emulsions. That is, they are thermodynamically unstable, require a surfactant to maintain the dispersion, and need an input of energy to initiate emulsification. Simple agitation via mixing may be sufficient, or higher shear means including the employment of high shear devices may be required. In other instances, a polymer emulsification or inversion method is needed.

A degree of agitation necessary to form the emulsion may require employment of mixing devices. Mixing devices typically provide the required energy input. Non-limiting examples of these mixing devices spanning the shear range include: 1) a vessel with an impeller, for example, propeller, pitched blade impeller, straight blade impeller, Rushton impeller, or Cowles blade; 2) kneading type mixers, for example, Baker-Perkins; 3) high shear devices which use positive displacement through an orifice to generate shear, for example, homogenizer, sonolater, or microfluidizer; 4) high shear devices using a rotor and stator configuration, for example, colloid mills, homomic line mills, IKA, or Bematek; 5) continuous compounders with single or dual screws; 6) change can mixers with internal impellers or rotor/stator devices, for example, Turello mixer; and 7) centrifugal mixers, for example, Hauschild speedmixers. Combinations of mixing devices can also provide benefits, for example a vessel with an impeller can be connected to a high shear device.

The choice of mixing device is based on the type of internal phase to be emulsified. For example, low viscosity internal phases can be emulsified using high shear devices which use positive displacement through an orifice. However, in the case of high viscosity internal phases, a rotor/stator device, twin screw compounder or change can mixer are often better choices. In addition, internal phases that contain hydrophilic groups are often easier to emulsify and therefore a simple vessel configured with an impeller may be sufficient.

The viscosity of the ionic saccharide-siloxane copolymers is dependent on such factors as the molecular weight of the siloxane portion, the number of saccharide units, the mole percent of saccharide units per siloxane, and the external conditions such as temperature and pressure. One skilled in the art would recognize that variable internal phase viscosities may be achieved by varying proportions in blends of saccharide-siloxane copolymers with solvents or solvent mixtures.

The most desirable order of ingredient addition in the preparation of the emulsion is determined empirically. For example, a desirable order of addition for a thick-phase emulsification may be: (a) solubilize the saccharide-siloxane copolymer in a solvent or solvent blend to a desired viscosity; (b) blend in a surfactant; (c) add water in increments with shear until a thick phase emulsion forms; (d) dilute with water to desired concentration, with shear. A desirable order of addition for a "pre-mix" with high shear may be: (a) add all the water to a mixing vessel configured with an impeller; (b) blend at least one surfactant with the water; (c) slowly add the saccharide-siloxane copolymer phase to the water to make a rough emulsion; (d) convey the rough emulsion through a high shear device until a desired particle size is achieved.

Nonionic surfactants are suitable for making the emulsions and include alkyl ethoxylates, alcohol ethoxylates, alkylphenol ethoxylates, and mixtures thereof Cationic, amphoteric and/or anion surfactants are also suitable and are typically added in addition to a nonionic surfactant. In a specific embodiment the emulsion comprises at least one nonionic surfactant and in another specific embodiment the emulsion comprises at least one cationic surfactant and at least one nonionic surfactant.

The present invention also provides methods of making compositions comprising ionically modified saccharide-siloxanes. In one embodiment the method comprises: reacting a quaternary ammonium compound comprising a substituent group, the substituent group comprising at least one of epoxide, halohydrin, anhydride or acrylate functionality, with a saccharide-siloxane copolymer as formulaically described above. In another specific embodiment the method comprises: reacting a carboxylate, phosphate, sulfate or sulfonate compound comprising a substituent group, the substituent group comprising at least one of epoxide, halohydrin, anhydride or acrylate functionality, with a saccharide-siloxane copolymer as formulaically described above. The reaction takes place between the functionalities of the substituent and the Z or Q functionality of the saccharide siloxane copolymer. In a further specific embodiment, the method comprises reacting a cyclic anhydride compound comprising carboxylate character wherein a ring opening yields a carboxylic acid group and an amide bond, with a linker group of a saccharide-siloxane copolymer as formulaically described above.

It should be understood that in the context of this disclosure any ranges disclosed should be construed to specifically disclose not only the endpoint(s) of the range, but all the values falling between the endpoints, individually, as well. For instance, a range of C1-C5 carbons would disclose C2, C3 and C4 carbons in addition to C1 and C5 carbons. Likewise, a range of 1-10 would disclose, inter alia, 3.1, 5, 9.9 and so on.

The following examples are provided for illustrative purposes only and should not be construed as limiting the scope of the invention.

EXAMPLES

Example 1

Preparation of a Cationic Sugar Siloxane

The reaction product at 1:1 saccharide to amine functional group of Dow Coming® 2-8175 (Dow Coming Corp, Midland, Mich.) with gluconolactone (Sigma-Aldrich, St. Louis Mo.) is diluted to 50% copolymer in 2-propanol. 194 g of this solution is loaded into a nitrogen purged, three-necked 500 mL round bottomed flask equipped with a condenser and temperature control andmagnetic stirrer. 5.91 g of (2,3-epoxypropyl)-trimethylammonium chloride (Fluka, Buchs, Switerland) is added with stirring. The reaction is maintained at 50° C. for four hours. The resultant product was straw colored and opaque. A waxy solid material is recoverable after the solvent is removed using a rotary evaporator. (Büchi Labortechnik AG, Flawil, Switerland)

Example 2

Preparation of a Cationic Sugar Siloxane Emulsion Using a Nonionic Surfactant 50 g of a solution prepared according to Example 1 is placed on a rotovap and the solvent is removed until an 80% solid solution remains. 22 g of this solution, 0.9 g of Tergitol 15-S-3 and 2.6 g of Tergitol 15-S-40 nonionic surfactants are placed in a disposable cup and mixed on a centrifugal mixer (Hauschild Speedmixer, Landrum S.C.). 1 g increments of water are added and mixed until a gel forms. 4-10 g increments of water are added and mixed to dilute the resultant emulsion. The final emulsion prepared according to this example contained 24% copolymer. The particle size was measured using a Nicomp 370(Particle Sizing Systems, Santa Barbara, Calif.). The volume weighted median particle size was 135 nanometers.

Example 3

Preparation of a Cationic Sugar Siloxane Emulsion Using a Cationic Surfactant 50 g of a solution prepared according to Example 1 were placed on a rotary evaporator and the solvent removed until an 80% solid solution remained. 40 g of this solution, 2.5 g of 2-propanol, and 11.72 g of Arquad 16-29 cationic surfactant (Akzo Nobel, Amersfoort, the Netherlands) were placed in a disposable cup and mixed on a centrifugal mixer (Hauschild Speedmixer, Landrum S.C.). 2 g increments of water were added and mixed until a gel was formed. 4-5 g increments of water were added and mixed to dilute the resultant emulsion. The final emulsion contained 40% copolymer. The particle size was measured using a Nicomp 370(Particle Sizing Systems, Santa Barbara, Calif.). The volume weighted median particle size was 183 nanometers.

Example 4

Preparation of an Anionic Sugar Siloxane

The reaction product at 1:1 saccharide to amine functional group of Dow Corning® 2-8175 (Dow Corning Corp, Midland, Mich.) with gluconolactone (Sigma-Aldrich, St. Louis Mo.) was diluted to 50% copolymer in 2-propanol. 49 g of this solution was loaded into a nitrogen purged, single-necked 100 mL round bottomed flask equipped with a condenser and magnetic stirrer. 1 g of succinic anhydride (Sigma-Aldrich, St. Louis Mo.) was added with stirring. The reaction was maintained at reflux for three hours. The resultant product was straw colored and slightly hazy. A waxy solid material was recovered after the solvent was removed using a rotary evaporator. (Büchi Labortechnik AG, Flawil, Switzerland). An FT-IR spectrum was obtained using a Nicolet Nexus 670 FTIR. A carbonyl peak was observed at 1731 cm$^{-1}$.

Example 5

Preparation of an Anionic Sugar Siloxane

The reaction product at 1:1 saccharide to amine functional group of Dow Corning® 2-8175 (Dow Corning Corp, Midland, Mich.) with gluconolactone (Sigma-Aldrich, St. Louis Mo.) was diluted to 50% copolymer in 2-propanol. 50 g of this solution was loaded into a nitrogen purged, single-necked 100 mL round bottomed flask equipped with a condenser and magnetic stirrer. 1 g of maleic anhydride (Sigma-Aldrich, St. Louis Mo.) was added with stirring. The reaction was maintained at reflux for three hours. The resultant product was straw colored and slightly hazy. A waxy solid material was recovered after the solvent was removed using a rotary evaporator. (Büchi Labortechnik AG, Flawil, Switerland). An FT-IR spectrum was obtained using a Nicolet Nexus 670 FTIR. A carbonyl peak was observed at 1715 cm$^{-1}$.

The invention claimed is:

1. An ionically-modified saccharide siloxane copolymer, comprising the reaction product of a saccharide-siloxane copolymer and an ionic monomer or oligomer, said saccharide-siloxane copolymer comprising a saccharide component and an organosiloxane component which are linked by a linking group having the formula:

$$R^2{}_a R^1{}_{(3-a)} SiO-[(SiR^2R^1O)_m-(SiR^1{}_2O)_n]_y-SiR^1{}_{(3-a)}R^2{}_a$$

wherein each $R^1$ can be the same or different and comprises hydrogen, $C_1$-$C_{12}$ alkyl, an organic radical, or $R^3$-Q, Q comprises an epoxy, cycloepoxy, primary or secondary amino, ethylenediamine, carboxy, halogen, vinyl, allyl, anhydride, or mercapto functionality, m and n are integers from 0 to 10,000 and may be the same or different, each a is independently 0, 1, 2, or 3, y is an integer such that the copolymer has a molecular weight less than 1 million, $R^2$ has the formula Z-$(G^1)_b$-$(G^2)_c$, and there is at least one $R^2$ per copolymer, wherein $G^1$ is a saccharide component comprising 5 to 12 carbons, b+c is 1-10, b or c can be 0, $G^2$ is a saccharide component comprising 5 to 12 carbons additionally substituted with organic or organosilicon radicals, Z is the linking group and is independently selected from the group consisting of:
—$R^3$—NHC(O)—$R^4$—;
—$R^3$—NHC(O)O—$R^4$—;
—$R^3$—NH—C(O)—NH—$R^4$—;
—$R^3$—C(O)—O—$R^4$—;
—$R^3$—O—$R^4$—;
—$R^3$—CH(OH)—CH$_2$—O—$R^4$—;
—$R^3$—S—$R^4$;
—$R^3$—CH(OH)—CH$_2$—NH—$R^4$—;
—$R^3$—N($R^1$)—$R^4$; and $R^3$ and $R^4$ are divalent spacer groups comprising $(R^5)_r(R^6)_s(R^7)_t$, where at least one of r, s and t must be 1, and $R^5$ and $R^7$ are either $C_1$-$C_{12}$ alkyl or $((C_1$-$C_{12})O)_p$ where p is any integer 1-50 and each $(C_1$-$C_{12})O$ may be the same or different, $R^6$ is —N($R^8$)—, where $R^8$ is H or $C_1$-$C_{12}$ alkyl, or is Z-X where Z is previously defined or $R^3$, X is a carboxylic acid, phosphate, sulfate, sulfonate or quaternary ammonium radical, and at least one of $R^3$ and $R^4$ must be present in the linking group and may be the same or different, and wherein the saccharide-siloxane copolymer is a reaction product of a functionalized organosiloxane polymer and at least one hydroxy-functional saccharide such that the organosiloxane component is covalently linked via the linking group, Z, to the saccharide component.

2. The ionically-modified saccharide siloxane copolymer according to claim 1, wherein the hydroxy-functional saccharide comprises an aldonic acid or an oligoaldonic acid.

3. The ionically-modified saccharide siloxane copolymer according to claim 2, wherein the aldonic acid or the oligoaldonic acid comprise a lactone.

4. The ionically-modified saccharide siloxane copolymer according to claim 2, wherein the oligoaldonic acid comprises lactobionic acid.

5. The ionically-modified saccharide siloxane copolymer according to claim 1, wherein the organosiloxane polymer comprises a polydimethylsiloxane.

6. The ionically-modified saccharide siloxane copolymer according to claim 1, wherein the linking group, Z, comprises an amide, an amino, a urethane, a urea, an ester, an ether, a thioether, or an acetal functional linking group.

7. The ionically-modified saccharide siloxane copolymer according to claim 1, wherein the linking group comprises an amino functional linking group selected from the group consisting of an aminopropyl functional group and an aminoethylaminoisobutyl functional group.

8. The ionically-modified saccharide siloxane copolymer according to claim 1, wherein the saccharide-siloxane copolymer comprises the reaction product of an amino-functional organosiloxane and an aldonolactone.

9. The ionically-modified saccharide siloxane copolymer according to claim 1, wherein the ionic monomer or oligomer is covalently bound to the linking group, Z, or Q.

10. The ionically-modified saccharide siloxane copolymer according to claim 1, wherein the ionic monomer or oligomer includes a reactive component selected from the group consisting of a β-halogenated alkyl, a 3-chloro-2-hydroxypropyl radical, 2,3-epoxypropyl group, anhydride, acrylate and methacrylate.

11. The ionically-modified saccharide siloxane copolymer according to claim 1, wherein the ionic monomer or oligomer includes an ionic component selected from the group consisting of alkylammonium halide, sulfate, sulfonate, phosphate, carboxylic acid and the salts thereof.

12. The ionically modified saccharide siloxane copolymer according to claim 1, comprising the reaction product of a molecule comprising a reactive component wherein the reactive component reacts with the linking group Z of the saccharide siloxane copolymer to impart ionic functionality and cationic or anionic character.

13. The ionically-modified saccharide siloxane copolymer according to claim 12, wherein the molecule reacted to impart cationic character comprises 3-chloro-2-hydroxypropyltrimethylammonium chloride (chlorohydrin), 2,3-epoxypropyltrimethylammonium chloride (glycidyltrimethylammonium chloride); 2-(acryloyloxy)ethyl]trimethylammonium chloride; chlorostyrene; and 3-chloro-2-hydorxypropyl -alkyldimethylammonium chloride, wherein the alkyl is selected from dodecyl-, cocoalkyl, or stearyl, wherein the reaction product comprises a quaternary ammonium group comprising a methyl group substituted by a long-chain alkyl group.

14. The ionically-modified saccharide siloxane copolymer according to claim 12 wherein the molecule reacted to impart anionic character comprises 3-sulfopropyl acrylate potassium salt, chloroacetic acid, 2-carboxyethyl acrylate, poly(2-carboxyethyl) acrylate, maleic anhydride, substituted maleic anhydride, poly(ethylene-co-butyl acrylate-co-maleic anhydride), poly(methyl vinyl ether-alt-maleic anhydride), dichloromaleic anhydride, dimethylmaleic anhydride, diphenylmaleic anhydride, glutaric anhydride, substituted glutaric anhydride, hexafluoroglutaric anhydride, phthalic anhydride and derivatives, 4-sulfo-1,8-naphthalic anhydride potassium salt, 4-amino-1,8-naphthalic anhydride, dimethylphthalic anhydride, succinic anhydride and its derivatives, (2-dodecen-1-yl)succinic anhydride, phenylsuccinic anhydride, 2-sulfobenzoic acid cyclic anhydride, itaconic anhydride, phosphoric acid, tetraphosphoric acid and phosphoric anhydride.

15. A dispersion comprising the ionic saccharide-siloxane copolymer according to claim 1, wherein the ionic saccharide copolymer is first solubilized by being dissolved in a solvent or solvent blend and then formed into the dispersion.

16. The dispersion according to claim 15 comprising a solution.

17. The dispersion according to claim 15, wherein the solvent comprises polydimethylsiloxane, hydrocarbon, alcohols, cyclic siloxane, hydrocarbon-alcohol mixtures, water, or combinations thereof.

18. The dispersion according to claim 16 comprising an emulsion.

19. The dispersion according to claim 18, wherein the emulsion comprises an oil in water emulsion comprising an internal phase comprising the ionic saccharide-siloxane and a continuous phase comprising water, wherein dispersion of the internal phase is maintained by at least one amphipathic surfactant.

20. A method for preparing an emulsion of the ionic saccharide-siloxane copolymer according to claim 1, the method comprising either 1) emulsifying preformed saccharide-siloxane fluids or polymers, or 2) polymerizing saccharide-siloxane monomers into higher molecular weight fluids and polymers in each individual emulsion particle.

21. A method for making a composition comprising the ionic saccharide-siloxane copolymer according to claim 1, the method comprising: reacting a quaternary ammonium compound comprising a substituent group, the substituent group comprising at least one of epoxide, halohydrin, anhydride or acrylate functionality, with the saccharide-siloxane copolymer.

22. A method for making a composition comprising the ionic saccharide-siloxane copolymer according to claim 1, the method comprising: reacting a carboxylate, phosphate, sulfate or sulfonate compound comprising a substituent group, the substituent group comprising at least one of epoxide, halohydrin, anhydride or acrylate functionality, with the saccharide-siloxane copolymer.

23. A method for making a composition comprising the ionic saccharide-siloxane copolymer according to claim 1, the method comprising: reacting a cyclic anhydride compound comprising carboxylate character, wherein a ring opening yields a carboxylic acid group and an amide bond, with the linker group, Z.

* * * * *